United States Patent [19]
Landis et al.

[11] Patent Number: 5,490,088
[45] Date of Patent: Feb. 6, 1996

[54] METHOD OF HANDLING DATA RETRIEVAL REQUESTS

[75] Inventors: Michael R. Landis; Anthony J. Yeates, both of Cary; Alex P. Hirsbrunner, Bloomingdale, all of Ill.

[73] Assignee: Motorola, Inc., Schaumburg, Ill.

[21] Appl. No.: 202,603

[22] Filed: Feb. 28, 1994

[51] Int. Cl.$^6$ ...................................................... G06F 17/30
[52] U.S. Cl. ........................................ 364/514 C; 395/600
[58] Field of Search ............................ 364/514; 358/400, 358/405; 455/33.1; 395/600, 200

[56] References Cited

U.S. PATENT DOCUMENTS

| | | | |
|---|---|---|---|
| 4,578,765 | 3/1986 | Barker et al. | 364/514 |
| 4,654,867 | 3/1987 | Labedz et al. | 379/59 |
| 4,697,281 | 9/1987 | O'Sullivan | 379/59 |
| 4,727,429 | 2/1988 | Ueno | 358/256 |
| 4,882,765 | 11/1989 | Maxwell et al. | 455/18 |
| 4,933,770 | 7/1990 | De Spain | 358/434 |
| 5,127,013 | 6/1992 | Yoshida | 371/32 |
| 5,235,433 | 8/1995 | Clarkson et al. | 358/434 |
| 5,261,069 | 11/1993 | Wilkinson et al. | 395/425 |
| 5,274,802 | 12/1993 | Altine | 395/600 |
| 5,297,208 | 3/1994 | Schlafly et al. | 380/49 |
| 5,361,143 | 11/1994 | Nakayama et al. | 358/500 |
| 5,367,698 | 11/1994 | Webber et al. | 395/800 |
| 5,369,501 | 11/1994 | Wilson et al. | 358/407 |
| 5,377,017 | 12/1994 | Lam | 358/405 |
| 5,381,346 | 1/1995 | Monahan-Mitchell et al. | 364/514 |
| 5,387,981 | 2/1995 | Orlen et al. | 358/400 |
| 5,388,196 | 2/1995 | Pajak et al. | 395/153 |
| 5,408,619 | 4/1995 | Oran | 395/325 |
| 5,434,994 | 7/1995 | Shaheen et al. | 395/500 |
| 5,446,740 | 8/1995 | Yien et al. | 370/110.1 |

OTHER PUBLICATIONS

Omen Technology Inc., "The ZMODEM Inter Application File Transfer Protocol", Oct. 14, 1988.
Vaughn, *Client/Server System Design & Implementation*, p. 84, 1994.
Meeks, "The Protocol Pack", Mar. 1989.
Meeks, "The ABCs of X–, Y–, and ZMODEM", Feb., 1989.
Woodcock et al., Microsoft Computer Dictionary, p. 424, 1993.

*Primary Examiner*—Emanuel T. Voeltz
*Assistant Examiner*—Patrick J. Assouad
*Attorney, Agent, or Firm*—Andrew S. Fuller

[57] ABSTRACT

A method of handling data retrieval requests is provided. A data server (108) receives a message, which message at least identifies a particular data set (202). The data server (108) determines whether the particular data set represents a complete data set, i.e., a complete and current version of the data (204). When the particular data set does represent a complete data set, the data server (108) confirms that the particular data set represents a complete data set (208). When the particular data set does not represent a complete data set, the data server (108) sends at least some additional data to facilitate the formation of a complete data set (206).

17 Claims, 4 Drawing Sheets

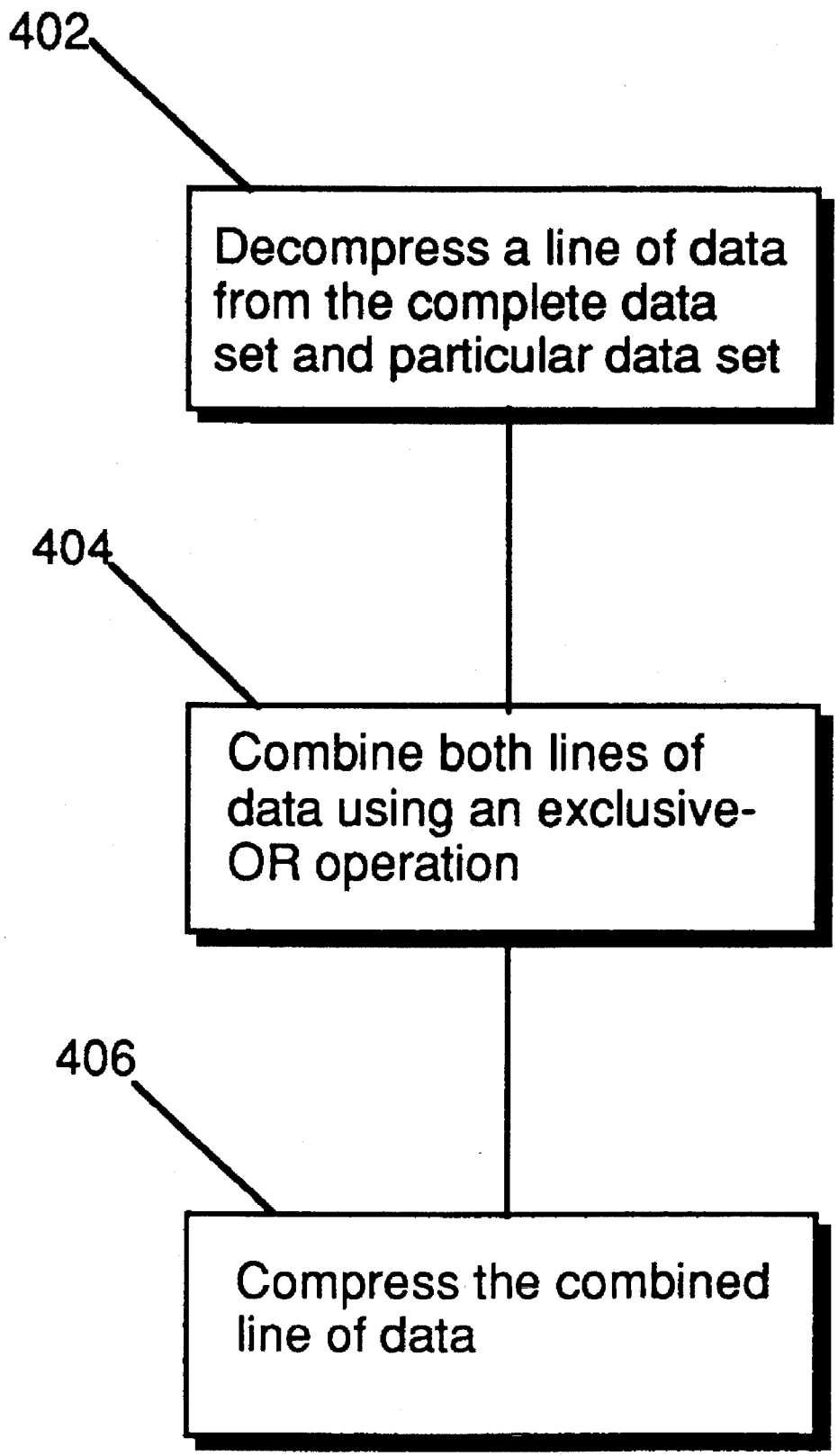

5,490,088

METHOD OF HANDLING DATA RETRIEVAL REQUESTS

TECHNICAL FIELD

This invention relates in general to data retrieval from a database, and more particularly, to the handling of data retrieval requests.

BACKGROUND

In many applications, access is required to centrally stored information by computing devices at remote sites. In one example, there is a need to retrieve the most current information from a central database for presentation at a remote site. Communications between the central database and the remote site can be quite complicated if there are many remote sites attempting to access the central database concurrently. One popular approach for managing these communication, is the use of a client/server model for data distribution. The data server interfaces with the central database to provide orderly access to the data by data clients at the remote sites. Thus, a client needing information from the central database makes a request to the database server, and the data server responds to the client with the information sought.

There are some problems which arise in the server/client model, which are particularly acute when the remote sites are connected through wireless communication. One such problem is the general limited transmission capacity for communications between the server and the client. This problem is magnified when the amount of data transferred is relatively large, and data requests are frequent in order to maintain the currentness of information at the remote site for a critical application. For example, consider a remote client in the form of a wireless computing device which maintains and presents graphical images to an operator. The presentation of images typically requires large quantities of data. If the image data must always be kept fairly current, information must be transferred from the central database to the computing device. However, the data transmission capacity of the communication link between the client and the server places an upper limit on the quantity of data which may be transferred within a specific time period. Thus, there is a need to minimize the amount of data transmitted.

Many prior art solutions focus on the efficient and timely transfer of information between a centrally located data server and a remote client. Some prior art solutions focus on data compression. Data compression seeks to condense information, usually by removing useless repetition of data, such that the total amount of information transferred is reduced. Another focus is on the provision of more high speed transmission capacity. By increasing the data transmission rate, the total time required to transfer information from the server to the client is reduced.

There has been an increase in the use of wireless communication devices for presenting an operator with images, or other types of documents, which typically require large quantities of data for presentation. Computation and/or storage capabilities within these devices may be limited. Some methodologies exist in the prior art to facilitate this data transfer between server and clients. Yet, there still remains a need to provide even more expedient methodologies for maintaining updated information, particularly, those requiring a large data content, at remote sites.

BRIEF DESCRIPTION OF THE DRAWINGS

FIG. 4 is a flow chart of procedures used by the data server to generate a changes document, in accordance with the present invention.

DETAILED DESCRIPTION OF THE PREFERRED EMBODIMENT

Generally, this invention provides a method of handling data retrieval requests, by efficiently providing information from a centrally located database to keep information current on a data client. The invention recognizes that the amount of data needed to be sent to the client can be significantly reduced by proper assessment of the client's request for update information, and proper determination of the most efficient manner to respond to the client's request. By reducing the amount of data sent to the client, the total time and cost required for data transmission is reduced. As data transmission is often retarded because of lack of transmission capacity, or lack of transmission speed, a reduction in the quantity of data transferred significantly improves the data communication system. The method, according to the present invention, establishes a protocol between the server and client such that the client identifies the data for which it seeks an update. The server then determines if the client already possesses the most current data that the server has, and if so, confirms this with the client. If the client does not have the most current data, the server provides the updated information in the most appropriate format needed by that client to quickly and efficiently utilize the data.

Figure 1:
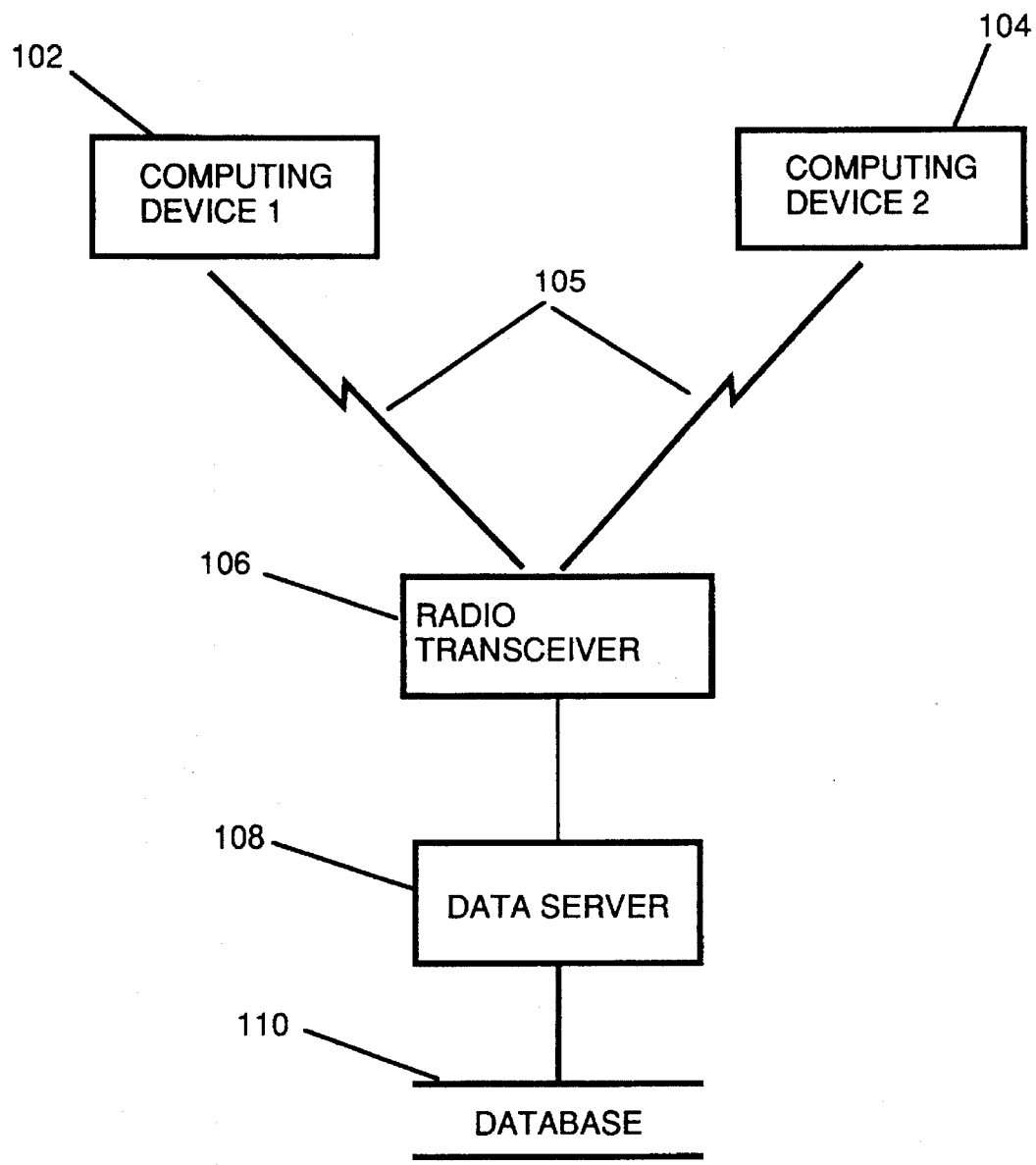
FIG. 1 is a block diagram of a data communication system configured in accordance with the present invention.

The present invention can be better understood with references to FIGS. 1–4. FIG. 1 depicts a data communication system with a central data server 108 and remote data clients 102, 104 coupled by communication links 105. The data communication system includes a data repository or database 110, a data server 108, data clients 102, 104, and communication links 105 between the data clients 102, 104 and the data server 108. The database 110 stores information needed to properly support the data client 102, 104. Thus, the type of data stored in the database 110 depends on the type of data required by the data clients 102, 104. In the preferred embodiment, the data stored includes raster formatted graphical images. The database 110 may be organized using a hierarchical file system, a relational database, or any suitable data organization scheme. Typically, the database 110 is implemented using a database management system on computer hardware, such as a main frame computer, a mini-computer, a work-station, or a micro-computer.

The data server 108 provides controlled access to the database 110. Generally, the data server 108 is implemented in software within a software program or set of software programs. However, a combination of hardware and software components may be used. According to the invention, a significant function of the data server 108 is the resolution of data clients' 102, 104 requests for information needed to ensure that the data clients 102, 104 have complete and current information. The data server 108 evaluates a data client's 102, 104 request and forms an appropriate response to be sent back to the data client 102, 104. The resolution procedure is described in more detail below.

The data clients 102, 104 are typically computing devices which are remotely situated. The data client 102, 104 may utilize the information from the data server 108 in a variety of ways. For example, the data client 102, 104 may use the data received from the server to present a display image to an operator. A communication link 105 between the data server 108 and the data clients 102, 104 provide a data path for the transmission of requests for data and the corresponding response. The communication link 105 may be an established local area network, a temporary link such as by telephone, or a wide area network, and the communication link 105 may be wired or wireless. In the preferred embodiment, the communication link 105 is established over a wireless network of transmitters and receivers, and the data server 108 communicates over this wireless network using a radio transceiver 106. Recognizing that the network represents a limited communication resource, the present invention provides for a method of reducing the amount of information, and consequently communication link 105 traffic, which flows between the data server 108 and a data client 102, 104 over the network.

The document stored in the database 110 which is required by the data client 102, 104 is defined as a complete data set. Thus, when a data client 102, 104 has the complete data set, that data client 102, 104 has all of the information it needs from the data server 108 to form a complete and current version of the data for the purposes of that data client 102, 104. The complete data set may comprise several documents or files. A document typically consists of one or more files. In a data client's 102, 104 request to the data server 108, the data client 102, 104 provides information about a particular data set. Typically, the particular data set corresponds to a version of data stored on the data client 102, 104, which might have been at one time a complete data set. Information about the particular data set is used by the data server 108 to identify the corresponding complete data set.

Figure 2:
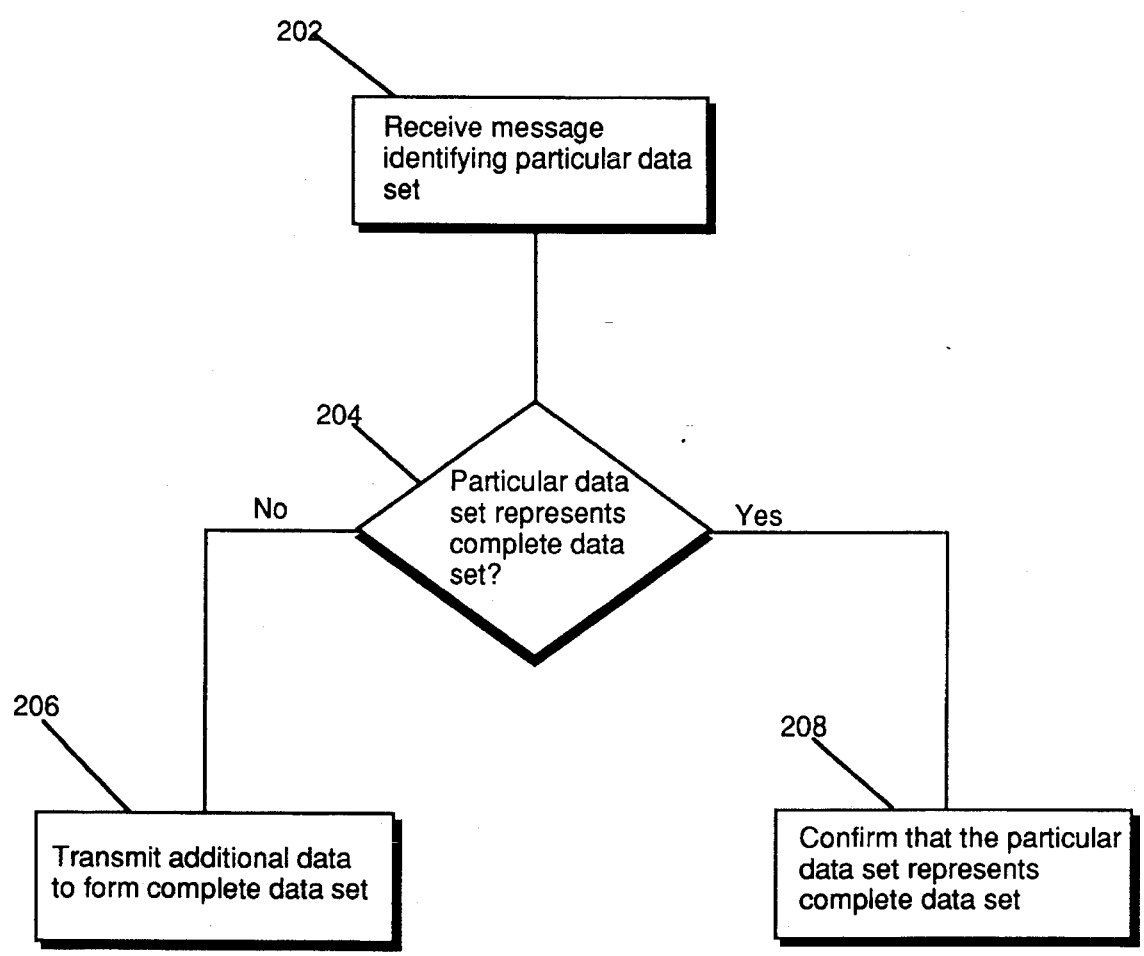
FIG. 2 is a flow chart of procedures used by a data server to respond to client requests for update information, in accordance with the present invention.

FIG. 2 is a flow chart of procedures used by the data server 108 to respond to a data client's 102, 104 requests for update information, in accordance with the present invention. The exchange between the data server 108 and the data client 102, 104 is a significant aspect of the present invention. First, the data server 108 receives a message which at least identifies a particular data set, step 202. The message may contain other significant information as well. For example, the client request may include client identification information, special instructions to the data server 108, such as client requested verification, as well as other useful information. Second, the data server 108 determines whether the particular data set represents a complete data set, step 204. In making this determination, the data server 108 may rely on additional information present in the client request, such as a version number, or the database 110 may contain information specifically identifying the status of the data known to be present on the data client 102, 104. Thus, the data server 108 may determine whether the particular data set identified by the data client 102, 104 constitutes the latest and complete version. After determining that the data possessed by the data client 102, 104 is current and complete, based on the particular data set identified in the data client 102, 104 request, the data server 108 then forms an appropriate response. When the particular data set identified by the data client 102, 104 does represent a complete data set, the data server 108 confirms to the data client 102, 104 that the particular data set represents a complete data set, step 208. Thus, the data client 102, 104 would receive verification that its local version of the complete data set is complete and current. However, when the particular data set does not represent a complete data set, the data server 108 transmits at least some additional data to facilitate the formation of a complete data set, step 206.

The complete data set in the database 110 is known to the data server 108, and the status of the data present on the data client 102, 104, i.e., the data client's 102, 104 local version of data, is also known to the data server 108. Ordinarily, if the server determines that the client does not have the complete data set, the data server 108 determines what additional data would be needed to make the data on the data client 102, 104 current and complete. The data server 108 first obtains first data identified by the particular data set. This first data represents the data known to be stored on the data client 102, 104. Next, the data server 108 obtains second data that comprises the complete data set, i.e., the complete and up-to-date version of the data requested by the data client 102, 104, as identified by the particular data set and optionally a version number. The data server 108 then combines the first data with the second data in a predetermined operation to obtain the additional data. The additional data represents the changes between the complete data set and the particular data set, i.e., the local version of data presently on the data client 102, 104. The terms "additional data" and "changes document" are used synonymously herein.

Figure 3:
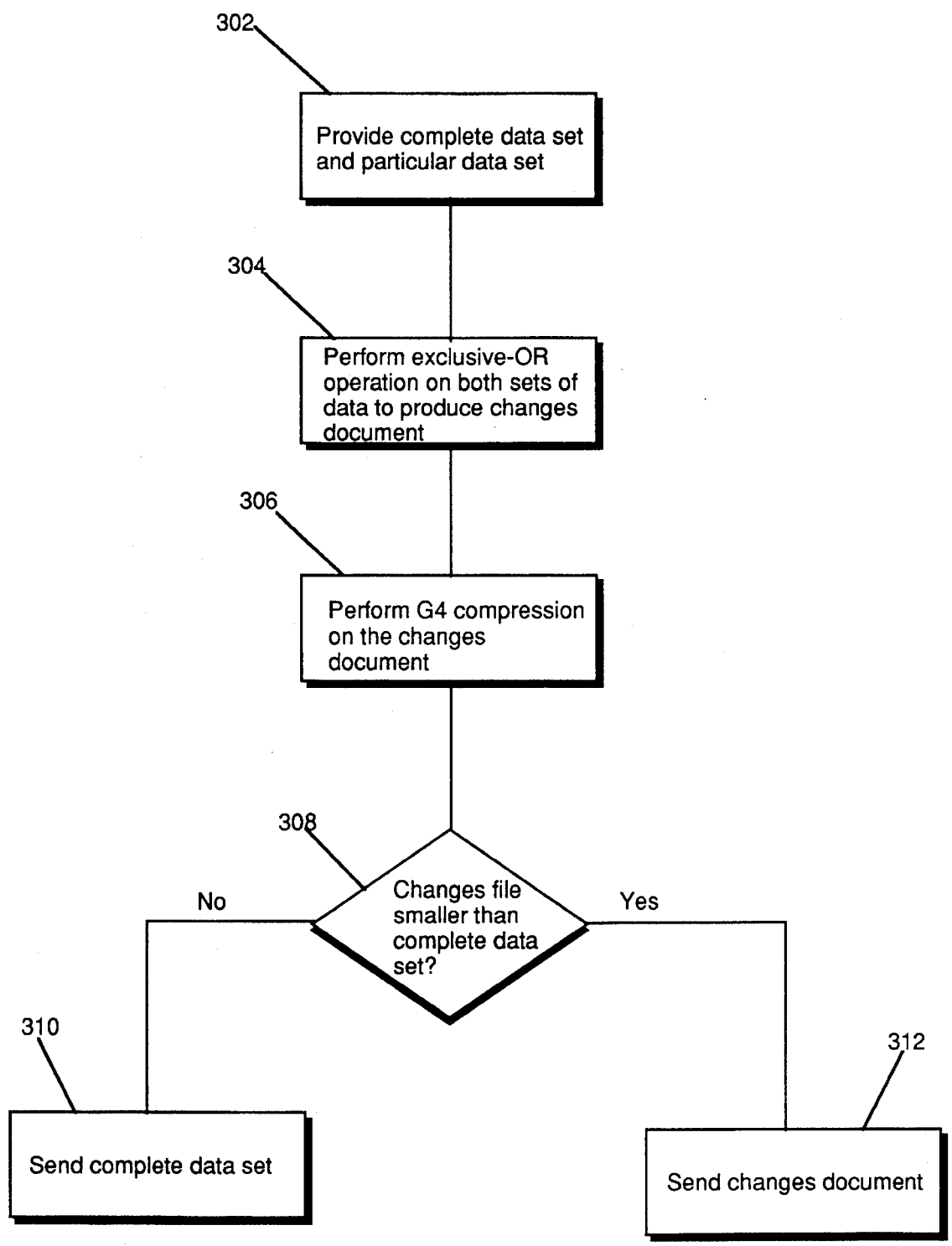
FIG. 3 is a flow chart of procedures used by the data server to process graphical data, in accordance with the present invention.

The determination of what additional data should be sent to the data client 102, 104 depends on the types of data requested and the particular applications involved. FIG. 3 is a flow chart of procedures used by a data server 108 processing requests for graphical data, in accordance with the present invention. The graphical data is stored partially as bi-level raster images in the database 110. The latest version and most complete representation of the image, i.e., the complete data set, is compressed using the International Telegraph & Telephone Consultative Committee Group 4 (CCITT-G4) compression standard, and stored in a Tagged Intermediate File Format (TIFF) file or set of files. The version of the data locally stored on the data client 102, 104, the particular data set, is also compressed using CCITT-G4 compression, and stored within the database 110 in a TIFF-formatted file or set of files.

In general, the complete data set and the particular data set are retrieved from the database 110 by the data server 108, step 302. A changes document is created by applying an exclusive-OR operation to the complete data set and the particular data set in combination, step 304. This operation results in a changes document which represents the difference between the particular data set and the complete data set. The changes document is then compressed using CCITT-G4 compression, or other suitable compression techniques, step 306.

Referring to FIG. 4, the exclusive-OR operation, and also the CCITT-G4 compression, can be more efficiently performed on a line-by-line basis using two line buffers. First, a line of data from the complete data set, and the corresponding line of data from the particular data set are decompressed, step 402. Next, an exclusive-OR operation is applied to combine the data lines, step 404. Next, the combined data line is then compressed, step 406. These steps are repeated for each line of the complete data set and the particular data set and for each file in a multi-file document. By using line-by-line processing, the decompression, exclusive-OR, and compression operations require significantly less memory and file input and output activity.

Referring back to FIG. 3, the data server 108 makes a determination whether to respond to the data client's 102, 104 request with a copy of the complete data set, or the additional data which would then be used by the data client 102, 104 in combination with the particular data set then stored on the data client 102, 104 to form a complete data set. In deciding what data to send, the data server 108 determines whether the complete data set is smaller than any additional data that would be necessary to complete the particular data set. Particularly, the size of the compressed changes document is then compared with the size of the complete data set to determine which is smaller, step 308. When the complete data set is smaller than the additional data required, the data server 108 transmits the complete data set to the data client 102, 104, step 310. When the complete data set is not smaller than the additional data, the data server 108 transmits the additional data, step 312. By sending the smaller data set, the transmission medium or communication link 105 is efficiently used, and the client can be provided with a complete data set in a shorter time period.

Generally, the changes document will contain one or more sparsely populated arrays representing differences between the complete data set and the particular data set. The sparse arrays are then compressed using CCITT-G4 compression, which provides an optimal compression for sparse arrays. Additional levels and types of compression can be accommodated. For example, in the preferred embodiment, additional compression of the entire TIFF-formatted file can be used to further reduce the size of the data stored. The complete data set may include header data and image data. The header data comprises additional information to facilitate the processing of the image data.

The changes document may be combined with the particular data set to produce the complete data set. Since the particular data set may already be stored on the data client 102, 104, the transmission of the additional data would enable the client to create the complete data set. If a changes document is sent, this is accomplished by combining the additional data with the particular data set stored on the client. It is possible, although unlikely, that the generated compressed changes document may be larger than the size of the complete data set required by the data client 102, 104. When the compressed changes document is larger, the complete data set is sent. When the compressed changes document is smaller than the requested complete data set, the data server 108 sends the changes document to the client. Additional criteria can be used to determine whether to send the changes document or the complete data set.

The comparison of the size of the additional data and the complete data set may be based on actual measured data quantities, but may also be done on estimates of the relative sizes of the data sets. For example, historical data on the size of generated changes documents can be used to estimate the size of a requested changes document. Additionally, in some cases it might be better to always send a complete data set when the version of the particular data set, locally stored on the data client 102, 104, is significantly older than the version of the complete data set.

Typically, the changes document is created in response to a data client's 102, 104 request and deleted after use. However, to increase the response time of the data server 108, the changes document can optionally be created and stored in anticipation of requests from the data clients 102, 104. Moreover, a changes document created upon request may be stored in anticipation of further requests. For example, in another variation of the present invention, a list of complete data sets and corresponding changes documents are stored in a data table of the database 110. The data table is queried by the data server 108 upon receiving requests from the data client 102, 104. When, according to the data table, the particular data set is not a complete data set, the additional data required is determined from the data table. Further variations in the generation of changes documents, and in the storage and retrieval the complete data set, are possible while still incorporating the concepts embodied by the present invention.

In summary, the present invention provides a method of handling data retrieval requests from a data client to a data server. A data communication system in accordance with the present invention offers important benefits. The data server evaluates requests for update information from data clients to determine the most appropriate response. The response is based, at least in part, on reducing the amount of data needed to be transmitted to the data client. Thus, a data communication system, according to the present invention, can realize greater communication throughput, reduced costs, and significantly improved response time.

What is claimed is:

1. In a data retrieval system having a computer with a data server that accesses a database, the database having a complete data set represented therein, the system having a data client having a communication link with the data server, a method of handling data retrieval requests to the data server, the method comprising the steps of:

receiving a message, by the data server, which message at least identifies a particular data set related to the complete data set represented in the database;

determining, by the data server, whether the particular data set represents the complete data set;

when the particular data set does represent the complete data set, transmitting to the data client a confirmation message indicating that the particular data set represents the complete data set;

when the particular data set does not represent the complete data set, transmitting to the data client at least some additional data to facilitate forming the complete data set including the steps of:
obtaining first data identified by the particular data set;
obtaining second data that comprises the complete data set;
combining the first data with the second data in a predetermined operation to obtain the additional data, including the step of obtaining data representing Changes between the complete data set and the particular data set.

2. The method of claim 1, wherein the step of receiving a message, which message at least identifies a particular data set, includes the step of identifying a particular data set comprising a document.

3. The method of claim 2, wherein the step of identifying a particular data set comprising a document includes the step of identifying a document at least partially comprised of a raster image.

4. The method of claim 1, wherein the step of determining whether the particular data set represents the complete data set includes the step of determining whether the particular data set constitutes a latest version.

5. The method of claim 1, wherein the step of confirming that the particular data set represents a complete data set includes the step of transmitting a confirmation message.

6. The method of claim 1, wherein the step of combining the first data with the second data in a predetermined operation to obtain the additional data includes the step of performing an exclusive-OR operation on the first and second data.

7. The method of claim 1, wherein step of transmitting at least some additional data to facilitate forming a complete data set comprises the step of:

determining the additional data by querying the database.

8. In a data retrieval system having a computer with a data server that accesses a database, the database having a complete data set represented therein, the system having a data client having a communication link with the data server, a method comprising the steps of:

receiving, by the data server, a message transmitted by the data client, which message at least identifies a particular data set corresponding to a version of the complete data set;

determining whether the particular data set is current and complete as represented by the complete data set, including the steps of:

obtaining first data identified by the particular data set;

obtaining second data that comprises the complete data set;

combining the first data with the second data in a predetermined operation to obtain the additional data, including the step of obtaining data representing changes between the complete data set and the particular data set;

when the particular data set is current and complete, transmitting a confirmation message to the data client indicating that the particular data set represents the complete data set;

when the particular data set is not current and complete, determining whether the complete data set is smaller than any additional data that would be necessary to make the particular data set current and complete:

when the complete data set is smaller than the additional data, transmitting to the data client the complete data set;

when the complete data set is not smaller than the additional data, transmitting to the data client the additional data.

9. The method of claim 8, wherein the step of combining the first data with the second data in a predetermined operation to obtain the additional data includes the step of performing an exclusive-OR operation on the first and second data.

10. In a data retrieval system having a computer with a data server that accesses a database, the database having a complete data set represented therein, the system having a data client having a communication link with the data server, a method comprising the steps of:

receiving, by the data server, a message transmitted by the data client, which message at least identifies a particular data set corresponding to a version of the complete data set;

determining whether the particular data set is current and complete as represented by the complete data set;

when the particular data set is current and complete, transmitting a confirmation message to the data client indicating that the particular data set represents the complete data set;

when the particular data set is not current and complete, determining whether the complete data set is smaller than any additional data that would be necessary to make the particular data set current and complete, including comparing estimates representing the additional data with the complete data set:

when the complete data set is smaller than the additional data, transmitting to the data client the complete data set;

when the complete data set is not smaller than the additional data, transmitting to the data client the additional data.

11. The method of claim 8, wherein the step of receiving a message, which message at least identifies a particular data set, includes the step of identifying a particular data set comprising a document.

12. The method of claim 11, wherein the step of identifying a particular data set comprising a document includes the step of identifying a document at least partially comprised of a raster image.

13. The method of claim 8, wherein the step of determining whether the particular data set represents a complete data set includes the step of determining whether the particular data set constitutes a latest version.

14. The method of claim 8, wherein the step of confirming that the particular data set represents a complete data set includes the step of transmitting a confirmation message.

15. In a data retrieval system having a computer with a data server that accesses a database, the database having a complete data set represented therein, the system having a data client having a communication link with the data server, a method comprising the steps of:

receiving, by the data server, a message transmitted by the data client, which message at least identifies a particular data set corresponding to a version of the complete data set;

determining whether the particular data set is current and complete as represented by the complete data set;

when the particular data set is current and complete, transmitting a confirmation message to the data client indicating that the particular data set represents the complete data set;

when the particular data set is not current and complete, determining whether the complete data set is smaller than any additional data that would be necessary to make the particular data set current and complete:

when the complete data set is smaller than the additional data, transmitting to the data client the complete data set;

when the complete data set is not smaller than the additional data, transmitting to the data client the additional data, including the step of determining the additional data by querying the database.

16. In a data retrieval system having a data server with access to a database, a method comprising the steps of:

receiving a wireless communication comprising a message, which message identifies a particular data set that comprises a particular document;

determining whether the particular data set represents a most current data set for the particular document;

when the particular data set does represent the most current data set for the particular document, transmitting a wireless communication confirming that the particular data set represents a complete data set;

when the particular data set does not represent a complete data set for the particular document:

determining additional data that would be necessary to complete the particular data set for the particular document;

determining whether the complete data set is smaller than the additional data;

when the complete data set is smaller than the additional data, transmitting a wireless communication comprising the complete data set;

when the complete data set is not smaller than the additional data, transmitting a wireless communication comprising the additional data.

17. The method of claim 16, wherein step of determining additional data comprises the step of:

querying the database for the additional data.

* * * * *